United States Patent
Sakai

(10) Patent No.: US 8,035,775 B2
(45) Date of Patent: Oct. 11, 2011

(54) POLARIZATION CONTROL SYSTEM AND DISPLAY DEVICE

(75) Inventor: Akira Sakai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 12/377,183

(22) PCT Filed: Jul. 18, 2007

(86) PCT No.: PCT/JP2007/064194
§ 371 (c)(1),
(2), (4) Date: Feb. 11, 2009

(87) PCT Pub. No.: WO2008/029555
PCT Pub. Date: Mar. 13, 2008

(65) Prior Publication Data
US 2010/0171906 A1 Jul. 8, 2010

(30) Foreign Application Priority Data
Sep. 7, 2006 (JP) ................................. 2006-243284

(51) Int. Cl.
*G02F 1/1335* (2006.01)
*G02F 1/13* (2006.01)
*G02B 5/30* (2006.01)

(52) U.S. Cl. ........... 349/96; 349/112; 349/194; 359/485

(58) Field of Classification Search ................... 349/96, 349/112, 194; 359/485
See application file for complete search history.

(56) References Cited

U.S. PATENT DOCUMENTS

| 6,122,026 | A | 9/2000 | Takatani et al. |
| 6,924,856 | B2 | 8/2005 | Okumura et al. |
| 7,015,990 | B2 * | 3/2006 | Yeh et al. ........................ 349/96 |
| 7,315,338 | B2 * | 1/2008 | Yeh et al. ........................ 349/96 |
| 7,453,640 | B2 * | 11/2008 | Yeh et al. ...................... 359/492 |
| 2005/0190318 | A1 | 9/2005 | Okumura et al. |
| 2006/0114383 | A1 | 6/2006 | Kobayashi et al. |
| 2006/0262401 | A1 | 11/2006 | Takahashi et al. |

(Continued)

FOREIGN PATENT DOCUMENTS

EP  1 605 296 A2  12/2005

(Continued)

OTHER PUBLICATIONS

Chinese Office Action and English translation thereof mailed Feb. 6, 2010 in corresponding Chinese application 2001780032961.9.

(Continued)

*Primary Examiner* — Mike Qi
(74) *Attorney, Agent, or Firm* — Nixon & Vanderhye P.C.

(57) ABSTRACT

A polarization control system which includes an E-type polarizer and therefore can provide excellent dark state at a wide azimuth and viewing angle. Further, the polarization control system includes a viewing angle control element for controlling a traveling direction of light which has passed through the E-type polarizer and therefore can provide excellent bright state at a wide azimuth and viewing angle. Further a display device is disclosed including such a polarization control system. The polarization control system is a polarization control system including a plurality of polarizers, wherein the polarization control system includes an E-type polarizer and a viewing angle control element, and the viewing angle control element controls a traveling direction of light which has passed through the E-type polarizer.

19 Claims, 8 Drawing Sheets

U.S. PATENT DOCUMENTS

2008/0088759 A1* 4/2008 Utsumi et al. ............... 349/42
2009/0153783 A1* 6/2009 Umemoto ................. 349/96

FOREIGN PATENT DOCUMENTS

| JP | 5-134252 | 5/1993 |
| JP | 6-194648 | 7/1994 |
| JP | 8-122755 | 5/1996 |
| JP | 10-10487 | 1/1998 |
| JP | 2000-171617 A | 6/2000 |
| JP | 2000171617 A * | 6/2000 |
| JP | 2001-242320 | 9/2001 |
| JP | 2003-532141 | 10/2003 |
| JP | 2004-287377 | 10/2004 |
| JP | 2004-318060 | 11/2004 |
| WO | WO 97/39380 | 10/1997 |
| WO | WO 01/81991 | 11/2001 |
| WO | WO 2004/068179 | 8/2004 |

OTHER PUBLICATIONS

Partial European Search Report mailed Oct. 28, 2009 in European application 09002215.3.

Partial European Search Report mailed Oct. 28, 2009 in European application 07790948.9.

International Search Report for PCT/JP2007/064194 mailed Oct. 2, 2007.

Supplementary European Search Report mailed Oct. 28, 2009 in European application 07790948.9.

Examination Report Mailed Mar. 2, 2011 in European Application No. 07 790 948.9 (5 pages).

Yeh et al., "Optics of Liquid Crystal Displays," Published by John Wiley & Sons, Inc., 1999, XP002348122.

* cited by examiner

POLARIZATION CONTROL SYSTEM AND DISPLAY DEVICE

This application is the U.S. national phase of international Application No. PCT/JP2007/064194 filed 18 Jul. 2007 which designated the U.S. and claims priority to Japanese Patent Application No. 2006-243284 filed 7 Sep. 2006, the entire contents of each of which are hereby incorporated by reference.

TECHNICAL FIELD

The technology presented herein relates to a polarization control system and a display device. More specifically, the present invention relates to a polarization control system suitably used in a display device such as a liquid crystal display device and the like. The present invention further relates to a display device.

BACKGROUND ART

There are various types (generally, called "display mode") of the liquid crystal display device. A display mode in which a liquid crystal cell is arranged between a pair of polarizers disposed in Cross Nicol arrangement is the most common mode. Such a liquid crystal display device provides black display by disposing a pair of polarizers substantially in Cross-Nicol state (dark state) in the following system. Liquid crystal molecules are aligned substantially vertically to substrates such that the liquid crystal cell has a retardation, or alternatively, the liquid crystal cell has a retardation, but an optic axis azimuth of the cell is substantially parallel to or substantially vertical to a polarization axis azimuth (transmission axis azimuth or absorption axis azimuth) of the polarizers by rotating the liquid crystal molecules in the plane, and thereby the retardation is canceled. Such a system is effective in order to enhance contrast. Accordingly, this system has been applied to liquid crystal display devices in various display modes such as Vertical Alignment (VA) mode and In-plane Switching (IPS) mode.

FIGS. 4A to 7A are views each showing viewing angle characteristics of a cross transmittance in four different polarization control systems (i) to (iv). As mentioned below, the polarization control system (i) includes two O-type polarizers; the polarization control system (ii) further includes a retardation film in addition to the polarization control system (i); the polarization control system (iii) includes two E-type polarizers; and the polarization control system (iv) includes one O-type polarizer and one E-type polarizer. FIG. 4A is a view showing azimuth angle dependency of a cross transmittance at a polar angle of 60° in the respective polarization control systems. FIGS. 5A to 7A are views each showing polar angle dependency of a cross transmittance at azimuth angles of 0°, 45°, and 90° in the respective polarization control systems.

As a polarizer commonly used in the liquid crystal display device, for example, a polarizer prepared by uniaxially stretching a polyvinyl alcohol film to which iodine complex and the like has been adsorbed and aligning the iodine complex (hereinafter, also referred to as "conventional iodine polarizer") is known. If black display is provided using these two conventional iodine polarizers, excellent black display can be obtained in the front direction (at a polar angle of)0°, but light leakage is generated in oblique directions, as shown by (i) in FIG. 4A to 7A. This is because, as mentioned below, the conventional iodine polarizer is a so-called O-type polarizer, and therefore if a transmission axis azimuth of a back surface side-polarizer is not parallel to an absorption axis azimuth of an observation surface side-polarizer in oblique directions (the Cross-Nicol state can not be provided).

In order to solve this problem, a retardation film is conventionally used. That is, the retardation film performs compensation such that also in oblique directions, the transmission axis azimuth of the back surface side-polarizer is apparent parallel to the absorption axis azimuth of the observation surface aide-polarizer (in some display modes, the liquid crystal cell has a retardation in oblique directions, and in such a case, the liquid crystal cell is used as a retardation film). The transmission axis and the absorption axis are fixed in each polarizer, and therefore it is physically impossible to rotate azimuths of these axes. Accordingly, in practice, linearly polarized light (linearly polarized light whose electric field vector oscillation direction (oscillation surface) is parallel to the transmission axis azimuth of the back surface side-polarizer) which has been outputted from the back surface-side polarizer is rotated just by the oscillating direction while its ellipticity is maintained, thereby being converted into linearly polarized light whose electric field vector oscillation direction is parallel to the absorption axis azimuth of the observation surface side-polarizer.

However, a retardation value needed for such conversion varies depending on an observation azimuth and viewing angle (an angle made by line of sight and the normal direction of a screen in the liquid crystal display device, at an intersection of line of sight and the screen of the display device, i.e., an observation direction (angle)). Accordingly, according to the method involving use of the retardation film, as shown by (ii) in FIGS. 4A to 7A, light leakage can be reduced at specific azimuth and viewing angle, but not at every azimuth and viewing angle. In such a point, the method has room for improvement.

For this problem, a method in which a so-called E-type polarizer is used instead of the O-type polarizer, and a method in which an E-type polarizer is used as only one of a pair of polarizers have been proposed (for example, refer to Patent Documents 1 to 3).

Optical characteristics of the O-type polarizer and the E-type polarizer are mentioned below.

According to the conventional iodine polarizer, the stretching direction is an absorption axis and the direction perpendicular to the stretching direction is a transmission axis. Thus, only the absorption axis and the transmission axis of the polarizer in the polarizer plane are often considered. However, it is hardly known that the following point is important, if polarization characteristics of the polarizer, shown for incident light from a direction (oblique direction) other than the normal direction of the polarizer, are considered. That is, it is important which the absorption axis or the transmission axis the polarization axis of the polarizer in the normal direction is, i.e., whether a incident light component whose electric field vector oscillation direction is parallel to the normal direction of the polarizer transmits the polarizer or is absorbed by the polarizer.

The conventional iodine polarizer has a transmission axis in the normal direction of the polarizer, as shown in FIG. 8A. That is, the conventional iodine polarizer satisfies a relationship of $Ka \gg Kt \approx Kz$ where an imaginary part (also referred to as an "extinction coefficient") of a complex refractive index relative to light oscillating in the absorption axis azimuth in the polarizer plane is defines as Ka, an imaginary part of a complex refractive index relative to light oscillating in the transmission axis azimuth in the polarizer plane is defined as Kt, and an imaginary part of a complex refractive index relative to light oscillating in the normal direction is defined as Kz. This type of polarizer is a so-called O-type polarizer.

A polarizer shown in FIG. 8B is one whose absorption axis is in the normal direction of the element, that is, a polarizer satisfying a relationship of Kz≈Ka>>Kt. This type of polarizer is a so-called E-type polarizer (for example, refer to Patent Documents 1 and 2). The H-type polarizer is known to provide the Cross-Nicol state at a wider azimuth and viewing angle than those in the O-type polarizer, as shown by (iii) in FIGS. 4A to 7A. If the E-type polarizer and the O-type polarizer are used in combination, as shown by (iv) in FIGS. 4A to 7A, the Cross-Nicol state can be provided at a much wider azimuth and viewing angle (for example, refer to Patent Document 3).

The reason why the E-type polarizer can provide the Cross-Nicol state at a wider azimuth and viewing angle than those in the O-type polarizer is mentioned below. If light (electric field of an optical frequency) enters the polarizer from an oblique direction, the light has a component whose electric field vector oscillation direction is parallel to the normal direction of the polarizer. The E-type polarizer has an absorption axis in the normal direction, and therefore it can absorb the component whose electric field vector oscillation direction is parallel to the normal direction of the polarizer if the light enters the E-type polarizer from an oblique direction. In contrast, the O-type polarizer has a transmission axis in the normal direction of the polarizer, and therefore it transmits the component without absorbing it.

Further, the reason why the combination use of the E-type polarizer and the O-type polarizer can provide the Cross-Nicol state at a much wider azimuth and viewing angle is mentioned below. If the same type of two polarizers, i.e., the E-type of two polarizers, or the O-type of two polarizers, are used for providing the Cross-Nicol state, an transmission axis azimuth of one polarizer is not geometrically parallel to an absorption axis azimuth of the other polarizer when an observation point is in an oblique direction at an azimuth other than the polarization axis azimuth. As a result, light leakage is generated. In contrast, if the E-type polarizer and the O-type polarizer are used in combination, the transmission axis azimuth of the E-type polarizer is parallel to the absorption axis azimuth of the O-type polarizer when an observation point is in the oblique direction. Therefore, light leakage is not generated.

This is mentioned below in more detail with reference to FIGS. 9A, 9B, 10A, and 10B.

FIG. 9A is a planar view schematically showing an arrangement relationship among respective polarization axes when an observation point is in the normal direction of polarizers, in the case that both of a polarizer (back surface side-polarizer) and an analyzer (observation surface side-polarizer) are O-type polarizers and disposed in Cross-Nicol arrangement. FIG. 9B is a plane view schematically showing an arrangement relationship among the respective polarization axes in the configuration shown in FIG. 9A, when an observation point is at a viewing angle tilted at an azimuth of 45° (an azimuth at 45° relative to both of the absorption axis azimuth and the transmission axis azimuth). In this case, as shown in FIG. 9A, the Cross-Nicol state is provided in the normal direction of the polarizer (a transmission axis azimuth 11 of the polarizer is parallel to an absorption axis azimuth 13 of the analyzer). However, as shown in FIG. 9B, the Cross-Nicol state is not provided in an oblique direction (the transmission axis azimuth 11 of the polarizer is not parallel to the absorption axis azimuth 13 of the analyzer). Accordingly, it is found that in the oblique direction, linearly polarized light which has passed through the polarizer is not absorbed by the analyzer.

FIG. 10A is a planar view schematically showing an arrangement relationship of respective polarization axes when an observation point is in the normal direction of polarizers, in the case that the E-type polarizer is used as the polarizer and the O-type polarizer is used as the analyzer. FIG. 10B is a planar view schematically showing an arrangement relationship among the respective polarization axes in the configuration shown in FIG. 10A, when an observation point is at a viewing angle tilted at an azimuth of 45°. In this case, the Cross-Nicol state is provided not only in the normal direction of the polarizers, as shown in FIG. 10A, but also in the oblique direction, as shown in FIG. 10B (the transmission axis azimuth 11 of the polarizer is parallel to the absorption axis azimuth 13 of the analyzer). Although not shown in drawings, the Cross-Nicol state is maintained in the case that an observation point is at a viewing angle tilted at an azimuth other than the azimuth of 45°. That is, if the E-type polarizer and the O-type polarizer are used in combination, the Cross-Nicol state can be provided at every azimuth and viewing angle, in principle. As mentioned above, the E-type polarizer and the O-type polarizer are used in combination, the Cross-Nicol state can be provided at a wider azimuth and viewing angle.

[Patent Document 1]
Japanese Kohyo Publication No. 2001-504238
[Patent Document 2]
Japanese Kokai Publication No. 2001-242320
[Patent Document 3]
Japanese Kohyo Publication No. 2003-532141

DISCLOSURE OF INVENTION

However, if the E-type polarizer is used, Parallel-Nicol state (bright state) can not be provided at a wider azimuth and viewing angle. In such a point, there is room for improvement. FIGS. 4B to 7B are views corresponding to FIGS. 4A to 7A and each showing viewing angle characteristics of a parallel transmittance in the respective polarization control systems. For example, if two E-type polarizers are used, the Parallel-Nicol state can be provided when an observation point is at a viewing angle tilted at an azimuth parallel to the absorption axis azimuth of the E-type polarizer, similarly to the case that an observation point is in the normal direction of the polarizers. Therefore, excellent bright state can be provided as shown by (iii) in FIG. 7B. However, in comparison to the case that an observation point is in the normal direction of the polarizers, display is darker, as shown by (iii) in FIGS. 5B and 6B, when an observation point is at a viewing angle tilted at an azimuth parallel to the transmission axis azimuth of the E-type polarizer or at an azimuth of 45° (an azimuth at 45° relative to both of the absorption axis azimuth and the transmission axis azimuth). This applies to the case where the E-type polarizer and the O-type polarizer are used in combination, as shown by (iv) in FIGS. 5B to 7B.

There is also room for improvement in the same point, in the case that E-type polarizers are used in a liquid crystal display device in which two polarizers disposed in Cross Nicol state interposes a liquid crystal layer therebetween and Parallel Nicol state is provided by utilizing electrooptic effects of the liquid crystal layer, in addition to the case that two polarizers are disposed in Parallel-Nicol arrangement to provide bright state.

SUMMARY

The example embodiment presented herein has been made in view of the above-mentioned state of the art. The present embodiment has a feature to provide a polarization control system which can provide excellent dark state and bright state at wide azimuth and viewing angle. Further, the present embodiment has a feature to provide a display device including such a system.

The present inventor made various investigations on a polarization control system including a plurality of polarizers. First, the inventor noted that excellent dark state can be provided at wide azimuth and viewing angle by using an E-type polarizer because the E-type polarizer can absorb light whose electric field vector oscillation direction is parallel to the normal direction of the polarizer. Then, the inventor found the followings. The E-type polarizer transmits light whose electric field vector oscillation direction is parallel to the polarizer plane direction. Therefore, bright state can be provided when an observation point is at a viewing angle tilted at an azimuth parallel to an absorption axis azimuth in the polarizer plane, similarly to the case that an observation point is in the normal direction of the polarizer. However, if an observation point is at a viewing angle tilted at an azimuth parallel to a transmission axis azimuth in the polarizer plane, the E-type polarizer absorbs not only light whose electric field oscillation direction is parallel to the polarizer plane direction but also light whose electric field vector oscillation direction is parallel to the normal direction of the polarizer. As a result, display is darker in comparison to the case that an observation point is in the normal direction of the polarizer. Accordingly, excellent bright state cannot be provided at a wider azimuth or viewing angle. After further investigation, the present inventor found that the above-mentioned problem cannot be solved by the method involving use of the retardation film for controlling only the electric field vector oscillation direction of light, because in this method, the E-type polarizer absorbs light regardless of the electric field vector oscillation direction when an observation point is at a viewing angle tilted at an azimuth parallel to the transmission axis azimuth in the polarizer plane.

Then, the inventor found the followings. If a viewing angle control element for controlling a traveling direction of light which has passed through the E-type polarizer is used, part of light which has passed through the E-type polarizer can be converted into light which travels in an azimuth where the light insufficiently transmits the E-type polarizer, e.g., an azimuth parallel to the transmission axis azimuth in the plane of the E-type polarizer. Therefore, bright state can be provided at a wider azimuth and viewing angle. As a result, the above-mentioned problems have been admirably solved, leading to completion of the present invention.

That is, the present embodiment is a polarization control system including a plurality of polarizers, wherein the polarization control system includes an E-type polarizer and a viewing angle control element, and the viewing angle control element controls a traveling direction of light which has passed through the E-type polarizer (hereinafter, also referred to as "the first polarization control system"). The present embodiment is mentioned below in more detail.

DETAILED DESCRIPTION

Figure 1:
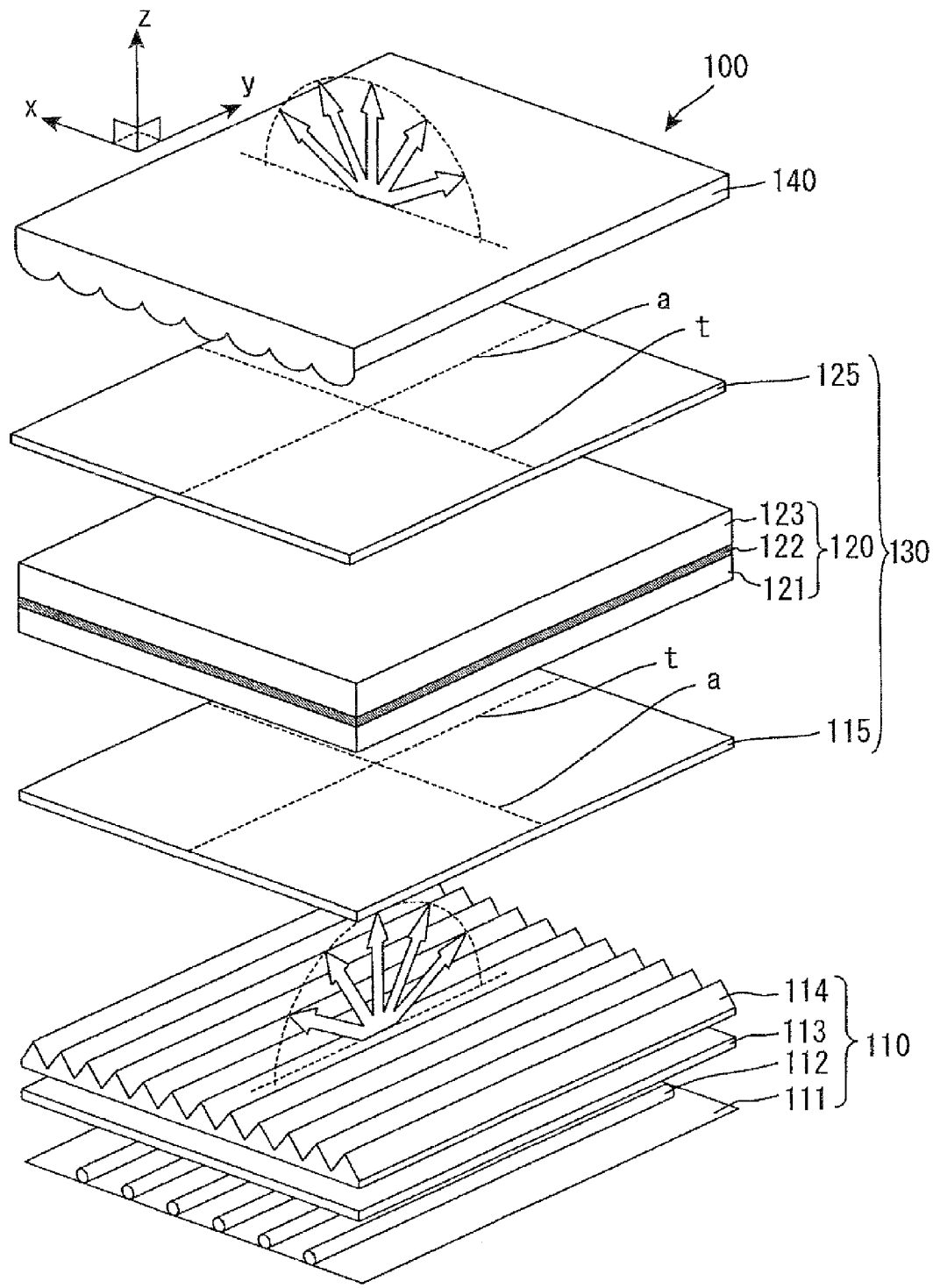
FIG. 1 is a perspective view schematically showing the liquid crystal display device in accordance with an example Embodiment.

The first polarization control system of the present embodiment includes a plurality of polarizers. Accordingly, the first polarization control system of the present embodiment can be used in a display device and the like. For example, the liquid crystal display device generally includes two polarizers. Therefore, the first polarization control system of the present embodiment can be applied to the liquid crystal display device. In the present description, the "polarizer" means an optical element which can convert natural light into linearly polarized light. The polarizer generally has both of an absorption axis and a transmissive axis in the polarizer plane. The absorption axis in the polarizer plane means a direction where an imaginary part of a complex refraction index is the maximum in the polarizer plane direction. The transmission axis in the polarizer plane means a direction where the imaginary part of the complex refraction index is the minimum in the polarizer plane direction. Accordingly, the polarizer generally transmits an incident light component whose electric field vector oscillation direction is parallel to a transmission axis direction in the polarizer plane and absorbs or reflects other incident light components. Thus, the polarizer converts natural light into linearly polarized light.

The complex refractive index is represented by the following formula (A).

$$N = n + iK \tag{A}$$

In the formula, a real part n of a complex refraction index represents a refractive index, and an imaginary part K represents an absorption index (extinction coefficient). The following method is used for determining the complex refraction index of the polarizer. A transmittance and thickness of the polarizer are measured and based on these measurement values, a complex refractive index is calculated back from the formula of electric field. The transmittance can be measured by a common method using a spectrophotometer, for example. The thickness can be measured by a micrometer.

If light at a wavelength $\lambda$, in vacuum travels in a medium with a complex refractive index N in z direction, the formula of light electric field is represented as the following formula (B).

$$E(z) = E_0 \times \exp\{i(\omega t - (2\pi/\lambda)N \times z + \Phi)\} = E_0 \times \exp\{i(\omega t - (2\pi/\lambda)(n + iK) \times z + \Phi)\} \tag{B}$$

In the formula, $E_0$ represents amplitude, $\omega$ represents angular frequency, t represents time, and $\Phi$ represents initial phase. If the transmittance of the element is considered, time evolution of electric field and initial phase need not to be considered, and therefore the both may be defined as zero. The light intensity is measured as a long-term average of poynting vector, but it is considered to be proportional to a square of an absolute value of an electric field when the absolute value is not taken into consideration. If the thickness of the polarizer is defined as d, the transmittance T of light having passed through the element is represented by the following formula (C).

$$T = |E(d)|^2/|E(0)|^2 = [\exp\{-(2\pi/\lambda)K \times d\}]^2 \tag{C}$$

Accordingly, the relationship between the transmittance T and the extinction coefficient K is determined by the following formula (D).

$$K = -\lambda/(4\pi \times d) \times \ln(T) \tag{D}$$

The complex refractive index has wavelength dependency. The complex refractive index in the present description means a complex refractive index at a wavelength of 550 nm.

The number of each of the transmission axis and the absorption axis, and the arrangement relationship between the transmission and absorption axes are not especially limited in the polarizer plane. Generally, the polarizer includes the transmission axis and the absorption axis one each in the plane, and such axes are perpendicular to each other. It is preferable that the polarizer satisfies a relationship of 100 nm$\leq$Ka$\times$d when an imaginary part of a complex refractive index for light oscillating in the absorption axis direction in the polarizer plane is defined as Ka and a thickness of the polarizer is defined as d. If Ka$\times$d is less than 100 nm, excellent dark state might not be provided. It is also preferable that the polarizer satisfies a relationship of Kt$\times$d$\leq$50 nm when an imaginary part of a complex refractive index for light oscillating in the transmission axis direction in the polarizer plane is defined as Kt. If Kt$\times$d is more than 50 nm, excellent bright state might not be provided.

The polarizer may serve as a circular polarizer, an elliptical polarizer, and the like, together with an optically anisotropic retardation film which is configured to generate $\lambda/4$ or $\lambda/2$ retardation for transmissive light at a wavelength $\lambda$ between two polarization components whose electric field vector oscillation directions are perpendicular to each other.

The above-mentioned first polarization control system includes an E-type polarizer. The "E-type polarizer" in the present invention means an optical element satisfying the following formula (E) when an imaginary part of a complex refractive index for light oscillating in the polarizer normal direction is defined as Kz.

$$|Ka - Kz| < |Kt - Kz| \tag{E}$$

According to this, the E-type polarizer can absorb light whose electric field vector oscillation direction is parallel to the normal direction of the polarizer. Therefore, excellent dark state can be provided at a wide azimuth and viewing angle.

It is preferable that the E-type polarizer satisfies a relationship of 100 nm$\leq$Kz$\times$d. If the Kz$\times$d is less than 100 nm, excellent dark state might not be provided. The E-type polarizer may satisfy Ka<Kz or Kz<Ka as long as it satisfies the formula (E) relationship. It is preferable that a difference between Ka$\times$d and Kz$\times$d is smaller in order to reduce viewing angle dependency of an absorptivity and/or a transmittance. It is preferable that E-type polarizer satisfies $|Ka \times d| - |Kz \times d| \leq 25$ nm. Further, the absorption axis outside the plane of the E-type polarizer may be perpendicular or inclined to the polarizer plane. The absorption axis outside the polarizer plane means a direction where the imaginary part of the complex refractive index is the maximum in the direction not parallel to the polarizer plane.

The first polarization control system includes a viewing angle control element for controlling a traveling direction of light which has passed through the above-mentioned E-type polarizer. The E-type polarizer absorbs light whose electric field vector oscillation direction is parallel to the normal direction of the polarizer. Therefore, if the E-type polarizer is arranged, excellent bright state can be generally obtained only at a narrow azimuth and viewing angle. The transmission axis and the absorption axis in the plane of the E-type polarizer are perpendicular to each other, generally. Accordingly, the E-type polarizer absorbs not only a component whose electric field vector oscillation direction is parallel to the normal direction of the polarizer but also a component whose electric field vector oscillation direction is parallel to the polarizer plane direction, of light which travels at an azimuth parallel to the transmission axis azimuth in the plane of the E-type polarizer. Therefore, particularly in the transmission axis azimuth in the plane of the E-type polarizer, display easily becomes darker at a wider viewing angle. However, according to the present embodiment, due to the use of the viewing angle control element, part of light which has passed through the E-type polarizer can be converted into light which travels at an azimuth where the light insufficiently transmits the E-type polarizer, e.g., an azimuth parallel to the transmission axis azimuth in the plane of the E-type polarizer. Therefore, bright state can be provided at a wide azimuth and viewing angle.

The above-mentioned viewing angle control element needs not to control the traveling direction of every light having passed through the E-type polarizer. The viewing angle control element may control a traveling direction of at least part of light having passed through the E-type polarizer. The viewing angle control element may be integrally formed with any of the polarizers, e.g., the outermost polarizer which is arranged on the output surface side. In order to obtain operation and effects of the present embodiment, the viewing angle control element controls a traveling direction of light which has passed through the plurality of polarizers, and it is arranged on the output surface side of the plurality of polarizers in the first polarization control system. In order to improve the viewing angle characteristics of the E-type polarizer, the viewing angle control element may be arranged to be on the output surface side of the E-type polarizer that is an object to be controlled. From the same viewpoints, it is preferable that the viewing angle control element is arranged on the output surface side of the outer most E-type polarizer arranged on the output surface side. In this case, the viewing angle control element may be integrally formed with the E-type polarizer.

The first polarization control system of the present embodiment is not especially limited as long as it includes a plurality of polarizers including the E-type polarizer and the viewing angle control element as components. The first polarization control system may or may not include other components.

Preferable embodiments of the first polarization control system are mentioned below in more detail. It is preferable that the viewing angle control element outputs part of light which has entered the viewing angle control element from an azimuth parallel to an absorption axis azimuth in a plane of the E-type polarizer into an azimuth substantially parallel to a transmission axis azimuth in the plane of the E-type polarizer. The absorption axis and the transmission axis in the plane of the E-type polarizer are perpendicular to each other, generally. Therefore, an intensity of transmitted light at an azimuth parallel to the absorption axis azimuth in the plane of the E-type polarizer is the largest. An intensity of transmitted light at an azimuth parallel to the transmission axis azimuth in the plane of the E-type polarizer is the smallest. Accordingly, the viewing angle control element has the above-mentioned functions, and therefore, the intensity of the transmitted light can be uniformed at every azimuth. Therefore, more excellent bright state can be obtained at a wide azimuth and viewing angle. In the present description, the phrase "substantially parallel" means not only a state where an azimuth is completely parallel to another azimuth, but also a state where an azimuth can be identified to be parallel in view of operation and effects of the present embodiment. It is more preferable that the viewing angle control element outputs part of light which has entered the viewing angle control element from an azimuth parallel to the absorption axis azimuth in the plane of the E-type polarizer into an azimuth at 45 to 70° relative to the transmission axis azimuth in the plane of the E-type polarizer. It is still more preferable that the viewing angle control element outputs part of light which has entered the viewing angle control element from an azimuth parallel to the absorption axis azimuth in the plane of the E-type polarizer into an azimuth at 45 to 90° relative to the transmission axis azimuth in the plane of the E-type polarizer.

It is preferable that the viewing angle control element is at least one optical element selected from the group consisting of a lens film, a scattering film, a light diffraction film, and an anti-glare film. These optical elements can control the traveling direction of light, and therefore, the operation and effects of the present invention can be effectively exhibited.

The above-mentioned lens film means an optical element which can change emission characteristics of incident light. The lens film is also referred to as a lens sheet, a prism film, a prism sheet, and the like. A common lens film can be used as the lens film. Examples of such a lens film include: a microlens array film including fine lens units in a plurality of arrays; a Fresnel lens consists of refractive tilt convex lens surfaces arranged in a concentric annular manner; and a lenticular lens film where vertically long lenses each having a corrugated cross sectional shape are arranged in the horizontal direction.

The above-mentioned scattering film means an optical element which diffuses incident light and which is used to uniform brightness. The scattering film is also referred to as a diffusion sheet, a diffusion film, and the like. A common scattering film can be used as the scattering film, for example. A scattering film having isotropic scattering performances (isotropic scattering film) and a scattering film whose scattering performances show incident angle dependency at a specific azimuth (anisotropic scattering film).

The above-mentioned light diffraction film is an optical element which generates light waves different in traveling direction by utilizing light diffraction.

The above-mentioned anti-glare film means an optical element which can prevent fluorescent tube or an observer itself from being reflected on the outermost surface of the display element in a bright room. A film which prevents such reflection, particularly a film which has a high haze can be used to exhibit a certain effect.

The present embodiment is also a polarization control system including a plurality of polarizers, wherein the polarization control system includes an E-type polarizer and a viewing angle control element, and the viewing angle control element is arranged in such a way that an azimuth where opaque state is observed is parallel to an absorption axis azimuth in a plane of the E-type polarizer (hereinafter, also referred to as "the second polarization control system"). If the viewing angle control element is arranged in accordance with this embodiment, a traveling direction of light which travels at an azimuth parallel to the absorption axis azimuth in the plane of the E-type polarizer, that is, a traveling direction of light which has passed through the E-type polarizer can be controlled with efficiency. Therefore, excellent bright state can be provided with efficiency at a wide azimuth and viewing angle. If the viewing angle control element is not arranged in accordance with this embodiment, the traveling direction of only part of light having passed through the E-type polarizer can be controlled. Therefore, excellent bright state might not be provided at a wide azimuth and viewing angle. In the present description, the "azimuth where opaque state is observed" means an azimuth where opaque state is observed due to light diffusion when an observation point is at a viewing angle of 30° or more. The above-mentioned azimuth where the opaque state is observed in the viewing angle control element is not necessarily perfectly parallel to the azimuth of the absorption axis in the plane of the E-type polarizer. It is preferable that an angle made by the azimuth where the opaque state is observed in the viewing angle control element with the azimuth of the absorption axis in the plane of the E-type polarizer is 40° or less. It is more preferable that such an angle is 20° or less. In addition, in the present description, the term "opaque state" means a state where a transmittance of parallel light beam is 85% or less. In order to more effectively exhibit the operation and effects of the present invention, the opaque state preferably means a state where the transmittance of the parallel light beam is 80% or less, and it more preferably means a state where the transmittance of the parallel light beam is 75% or less. The "transmittance of the parallel light beam" referred to in the present description is measured at a viewing angle of 30° with a goniophotometer (LCD 5200) produced by OTSUKA ELECTRONICS CO., LTD.

The second polarization control system of the present embodiment is not especially limited as long as a plurality of polarizers including an E-type polarizer and a viewing angle control element are included as a component. The second polarization control system may or may not include other components.

Preferable embodiments of the second polarization control system are mentioned below in more detail.

The above-mentioned viewing angle control element may have isotropic or anisotropic transmission and diffusion properties, but preferably have anisotropic transmission and diffusion properties. In this case, it is preferable that a diffusion major axis azimuth of the viewing angle control element is parallel to an absorption axis azimuth in the plane of the E-type polarizer. That is, it is preferable that the viewing angle control element shows anisotropic transmission and diffusion properties, and a diffusion major axis azimuth of the viewing angle control element is parallel to the absorption axis azimuth in the plane of the E-type polarizer. In the present description, the "diffusion major axis azimuth" means an azimuth where the opaque state is most highly observed (an azimuth where the transmittance of the parallel light beam is the minimum) in the direction (azimuth) in the plane of the viewing angle control element. If the viewing angle control element is arranged as mentioned above, the traveling direction of light which has passed through the E-type polarizer can be more efficiently controlled. Therefore, excellent bright state can be provided more efficiently at a wide azimuth and viewing angle. A microlens array sheet and the like may be mentioned as the viewing angle control element showing anisotropic transmission and diffusion properties. One or more diffusion major axis azimuths may exist. However, the diffusion major axis azimuth is preferably one in order to efficiently control the traveling direction of light which has passed through the E-type polarizer.

According to the above-mentioned viewing angle control element, optical element units for controlling an output direction of incident light are arrayed in plane. It is preferable that the viewing angle control element includes optical element units for controlling an output direction of an incident light beam, the optical element units being arrayed in plane, and an array direction of the optical element units is parallel or perpendicular to the absorption axis azimuth in the plane of the E-type polarizer. Because of use of such a viewing angle control element, the traveling direction of light which has passed through the E-type polarizer can be controlled more efficiently, and therefore, excellent bright state can be provided more efficiently at a wide azimuth and viewing angle. As the above-mentioned viewing angle control element including optical element units arrayed in plane, a microlens array film, a lenticular lens film, and a light diffraction film are suitably used. That is, it is preferable that the viewing angle control element is at least one optical element selected from the group consisting of a microlens array film, a lenticular lens film, and a light diffraction film. In the present description, the term "optical element unit" means a fine structural unit for controlling an output direction of incident light beam. A projection lens formed on a microlens array film, a wave-shaped long thin lens formed on a lenticular lens film, and the like are mentioned as the optical element unit.

The first or second polarization control system may include only the E-type polarizer as the plurality of polarizers, but it is preferable that the first or second polarization control system further includes an O-type polarizer. If the same types of two polarizers are used to provide Cross-Nicol state, for example, a transmission axis azimuth of one polarizer is not geometrically parallel to an absorption axis azimuth of the other polarizer when an observation point is in an oblique direction at an azimuth other than the transmission axis azimuth and the absorption axis azimuth. As a result, light leakage might be generated. In contrast, if the E-type polarizer and the O-type polarizer are used in combination to provide the Cross-Nicol state, the transmission axis azimuth of the E-type polarizer is parallel to the absorption axis azimuth of the O-type polarizer when an observation point is in an oblique direction. Therefore, light leakage is not generated. That is, the E-type polarizer and the O-type polarizer are used in combination, excellent dark state can be provided at a wide azimuth and viewing angle. The O-type polarizer can transmit light whose electric field vector oscillation direction is parallel to the normal direction of the polarizer. Therefore, if the E-type polarizer and the O-type polarizer are used in combination, more excellent bright state can be provided at a wider azimuth and viewing angle than those in the case that only the E-type polarizers are used.

The "O-type polarizer" in the present embodiment means a polarizer satisfying the following relationship (F).

$$|Ka-Kz|>|Kt-Kz| \quad (F)$$

It is preferable that the above-mentioned O-type polarizer satisfies a relationship of $Kz \times d \leq 50$ nm. If $Kz \times d$ is more than 50 nm, excellent bright display might not be provided. The O-type polarizer may satisfy a relationship of $Kt<Kz$ or $Kz<Kt$ as long as it satisfies the formula (F). However, it is preferable that a difference in $Kt \times d$ and $Kz \times d$ is smaller in order to reduce viewing angle dependence of an absorptivity and/or a transmittance. It is preferable that the O-type polarizer satisfies $|Kt \times d - Kz \times d| \leq 25$ nm. Further, the transmission axis outside the plane of the O-type polarizer may be vertical or tilted to the plane. The transmission axis outside the plane of the polarizer means a direction where an imaginary part of a complex refractive index is the maximum in the direction not parallel to the plane of the polarizer.

The order of staking the above-mentioned E-type and O-type polarizers is not especially limited. That is, the E-type polarizer may be arranged to be closer to the output surface than the O-type polarizer, or the O-type polarizer may be arranged to be closer to the output surface than the E-type polarizer.

It is preferable that the E-type polarizer and the O-type polarizer are disposed in Cross Nicol arrangement. That is, it is preferable that the absorption axis azimuth in the plane of the E-type polarizer is parallel to the transmission axis azimuth in the plane of the O-type polarizer when the first or second polarization control system of the present invention is observed in the normal direction of the polarizers. Such an embodiment can be preferably applied to, for example, a liquid crystal display device having a structure in which a liquid crystal layer is interposed between the E-type polarizer and the O-type polarizer.

The present embodiment is a display device including the first or second polarization control system. The display device of the present embodiment is configured to include the polarization control system which can provide excellent dark and bright states at a wide azimuth and viewing angle. Therefore, a display device with high display qualities, in which viewing angle characteristics are improved at a wide azimuth, can be provided. The display device is not especially limited, and a transmissive liquid crystal display device, a transflective display device, and the like, are mentioned.

It is preferable that the display device includes a liquid crystal display panel and a viewing angle control element on an observation surface side of the liquid crystal display panel, the liquid crystal display panel including a liquid crystal layer between a pair of polarizers, and at least one of the pair of polarizers being an E-type polarizer. According to this, also in a display device which performs display by utilizing electrooptic effects of the liquid crystal layer, the viewing angle characteristics can be improved at a wide azimuth. The above-mentioned liquid crystal display panel has a structure in which a back surface side-polarizer, a back surface side-substrate, a liquid crystal layer, an observation surface side-substrate, and an observation surface side-polarizer are stacked in this order. In order to decrease the number of stacked layers or protect the polarizer from mechanical damages, it is preferable that the back surface side-polarizer is arranged to be closer to the liquid crystal layer than the back surface side-substrate, and it is also preferable that the observation surface side-polarizer is arranged to be closer to the liquid crystal layer than the observation surface side-substrate. The viewing angle control element may be arranged on the back surface side of other members as long as it is arranged to be closer to the observation surface side than the observation surface-side polarizer.

It is preferable that one of the pair of polarizers is an E-type polarizer, and the other is an O-type polarizer. As mentioned above, the E-type polarizer and the O-type polarizer are used in combination, and thereby light leakage can be reduced in an oblique direction. Therefore, more excellent bright luminance can be provided at a wide azimuth and viewing angle. The O-type polarizer can transmit light whose electric field vector oscillation direction is parallel to the normal direction of the polarizer. Therefore, the E-type polarizer and the O-type polarizer are used in combination, and thereby more excellent white luminance can be provided at a wide azimuth and viewing angle. That is, if the E-type polarizer and the O-type polarizer are used in combination, a display device with higher display qualities in which viewing angle characteristics are improved at a wide azimuth can be provided.

It is preferable that the E-type polarizer and the O-type polarizer are disposed in Cross Nicol arrangement. That is, it is preferable that the absorption axis azimuth in the plane of the E-type polarizer is parallel to the transmission axis azimuth in the plane of the O-type polarizer when the display device of the present invention is observed in the normal direction of the polarizers. In view of providing high contrast, such an embodiment can be preferably applied to a liquid crystal display device in which a liquid crystal layer is interposed between two polarizers disposed in Cross-Nicol arrangement and using electrooptic effects of the liquid crystal layer, Parallel-Nicol state is provided. The display mode of the display device is not especially limited, but VA mode, IPS mode, and the like, are preferable.

It is preferable that the display device provides display using a light source device, an amount of light which is emitted by the light source device into an azimuth parallel to the absorption axis azimuth in the plane of the E-type polarizer is larger than an amount of light which is emitted by the light source device into an azimuth parallel to the transmission axis azimuth in the plane of the E-type polarizer. The E-type polarizer absorbs most of light which travels at an azimuth parallel to the transmission axis azimuth in the polarizer plane. Accordingly, if the light source device having the above-mentioned functions is used, an amount of light absorbed by the E-type polarizer can be reduced. Therefore, light use efficiency can be improved, and as a result, a display device in which a contrast ratio is high and bright state is provided at a wide viewing angle can be provided.

The above-mentioned light source device is generally arranged on the back surface side of the liquid crystal display panel. The following embodiments of the above-mentioned light source device are mentioned. An embodiment (1) in which the light source device includes light sources; and an embodiment (2) in which the light source device includes light sources and a directivity control member. According to the embodiment (1), the light source emits light with directivity. The light source which emits light with directivity is not especially limited, and a laser light source, a dotted light source, and the like, may be mentioned. According to the embodiment (2), light with low directivity, emitted from the light source, is provided with the above-mentioned directivity by the directivity control member, and then outputted. The light source which emits light with low directivity is not especially limited, and fluorescent tubes such as a cold cathode fluorescent tube (CCFL) and a hot cathode fluorescent tube (HCFL), a light-emitting diode (LED), and the like, are mentioned. As the directivity control member, a prism sheet having a light condensation function, an anisotropic diffusion sheet having various diffusion degrees depending on the direction, may be mentioned. The arrangement of the light source is not especially limited. A direct type or side-light type one may be used.

The polarization control system of the present embodiment includes an E-type polarizer and therefore can provide excellent dark state at a wide azimuth and viewing angle. Further, the polarization control system includes a viewing angle control element for controlling a traveling direction of light which has passed through the E-type polarizer and therefore can provide excellent bright state at a wide azimuth and viewing angle.

FIG. 1 is a perspective view schematically showing a liquid crystal display device in accordance with Embodiments of the present technology.

The liquid crystal display device in accordance with the present Embodiments has a structure in which diffuse illumination means (light source device) 110; a liquid crystal display panel 130 including an O-type polarizer 115, a liquid crystal cell 120, and an E-type polarizer 125; and a viewing angle control film (viewing angle control element) 140 are stacked in this order, as shown in FIG. 1. A liquid crystal display device 100 in accordance with the present Embodiments can be prepared by a common method. That is, the liquid crystal display device 100 can be prepared in the following manner: the diffuse illumination means 110, the liquid crystal display panel 130, the viewing angle control film 140, and if necessary, a component such as a retardation film are appropriately assembled, and thereinto, a driving circuit is incorporated.

The configuration of the liquid crystal display device of the present invention is not especially limited except that an E-type polarizer is used as at least one of the pair of polarizers and the viewing angle control film is used. A configuration of a common liquid crystal display device may be applied to the liquid crystal display device of the present invention. For example, according to the present Embodiments, the O-type polarizer 115 is arranged on a back surface side of the liquid crystal cell 120, and the E-type polarizer 125 is arranged on an observation surface side of the liquid crystal cell 120. However, the E-type polarizer 125 may be arranged on the back surface side of the liquid crystal cell 120, and the O-type polarizer 115 may be arranged on the observation surface side of the liquid crystal cell 120. According to the present Embodiment, the viewing angle control film 140 is not a member constituting the liquid crystal display panel 130 (is not a part of the liquid crystal display panel 130), but may be such a member constituting the liquid crystal display panel 130 (may be a part of the liquid crystal display panel 130). For example, the viewing angle control film 140 may be integrated with the E-type polarizer 125.

The respective members are mentioned below.

The diffuse illumination means 110 is composed of a light reflective sheet 111, a plurality of light sources 112, a light diffuser 113, and directivity control means (member) 114. Common light sources can be used as the light sources 112. For example, fluorescent tubes, such as a cold cathode fluorescent tube (CCFL) and a hot cathode fluorescent tube (HCFL), and a light emitting diode (LED), and the like may be used. As the directivity control means 114, a prism film which has a light condensing function (product of Sumitomo 3M Ltd., trade name; Brightness Enhancement Film BEF) and an anisotropic diffusion sheet whose diffusion degree varies depending on a direction (for example, refer to Japanese Kokai Publication No. Hei-04-314522) can be used in order to effectively exhibit the effects of the present embodiment.

According to the diffusion illumination means 110 in the present Embodiment, as shown in FIG. 1, it is preferable that an amount of light which is emitted by the diffusion illumination means 110 into an azimuth parallel to a y axis azimuth is larger than an amount of light which is emitted by the diffusion illumination means 110 into an azimuth parallel to an x axis azimuth. That is, the plurality of the light sources 112 output diffusion light with low directivity, in which a luminance of the diffusion light less depends on an angle, but it is preferable that the directivity control means 114 provides the diffusion light with the above-mentioned directivity. This is because the E-type polarizer 125 absorbs incident light from an oblique direction at an azimuth parallel to a transmission axis t azimuth of the E-type polarizer 125 more than incident light from an oblique direction at an azimuth parallel to a transmission axis t azimuth of the O-type polarizer 115. Accordingly, in order to reduce the amount of light which enters the E-type polarizer 125 at an azimuth parallel to the transmission axis t azimuth of the E-type polarizer 125, it is advantageous in terms of light use efficiency that the diffusion illumination means 110 is adjusted in such a way that an amount of light emitted into such an azimuth and that a relative amount of light emitted into an azimuth parallel to an absorption axis a azimuth of the E-type polarizer 125 is increased. Further, the diffusion illumination means 110 and the viewing angle control film 140 are optimally designed together, which can optionally adjust an intensity distribution of light which is finally outputted to the observation surface side.

The liquid crystal display panel 130 has a structure in which the O-type polarizer 115, the liquid crystal cell 120, and the E-type polarizer 125 are stacked in this order.

The O-type polarizer 115 is arranged to have an absorption axis a in the polarizer plane in the x axis direction and a transmission axis t in the polarizer plane in the y axis direction. The material for the O-type polarizer 115 and the method for forming the O-type polarizer 115 according to the present invention are not especially limited. For example, a polarizer prepared by stretching a polyvinyl alcohol film to which dichroic iodine complex and the like has been absorbed in a certain direction and aligning the dichroic iodine complex is mentioned. There are many commercially available polarizers which are O-type polarizers. For example, a polarizer (product of Nitto Denko Corp., trade name: SEG1224DU) can be used.

The liquid crystal cell 120 has a structure in which a back surface side-substrate 121, a liquid crystal layer 122, and an observation surface side-substrate 123 are stacked in this order. The liquid crystal cell 120 is interposed between a pair of the O-type polarizer 115 and the E-type polarizer 125, disposed in Cross Nicol arrangement. The liquid crystal cell 120 can modify a polarization state of incident light into a desired polarization state using electric optical effects of the liquid crystal layer 122. With regard to the liquid crystal cell 120 used in the present invention, polarizers disposed in Cross Nicol arrangement such as those in TN, VA, or IPS mode are preferably used in order to keep a certain angle made by the absorption axis a of the O-type polarizer 115 and the transmission axis t of the polarizer 125, and thereby the viewing angle is widened. However, any polarizers may be used. According to the present Embodiment, a VA mode liquid crystal cell is used as the liquid crystal cell 120. According to the VA mode liquid crystal cell 120, the liquid crystal layer 122 consists of liquid crystal molecules which are aligned vertically to the substrates under no voltage application.

The E-type polarizer 125 is arranged to have a transmission axis t in the polarizer plane in the x axis direction and an absorption axis a in the polarizer plane in the y axis direction. The material for the E-type polarizer 125 and the method for forming the E-type polarizer 125 according to the present invention are not especially limited. For example, a polarizer which is prepared by flow alignment of a lyotropic liquid crystalline dichroic pigment is mentioned. There are also commercially available products which are the E-type polarizers. For example, a polarizer (product of Optiva Corp., trade name: LC Polarizer) may be mentioned.

The material for the viewing angle control film 140 and the method for forming the viewing angle control film 140 are not especially limited as long as the film 140 can control a traveling direction of transmitted light. For example, a lens film (for example, refer to Japanese Kokai Publication No. Hei-05-249453), a scattering film (for example, refer to Japanese Kokai Publication No. Hei-06-82776), a light diffraction film (for example, refer to Japanese Kokai Publication No. Hei-09-127331), and the like, may be mentioned. An anti-glare film, which is practically used for surface treatment of an observation surface side-polarizer in a liquid crystal display device, (for example, product of Nitta Denko Corp., trade name: AG 150), may be also used. Such a viewing angle control film 140 is used to control a traveling direction of transmitted light, and thereby viewing angle characteristics under bright condition can be improved.

According to the present Embodiment, a common lenticular lens sheet and the like can be used as the viewing angle control film 140. For example, a lens sheet (product of (Dai Nippon Printing Co., Ltd., trade name: LCS sheet) can be used. A lenticular lens film, which is thinner than the lenticular lens sheet and which can be integrally formed with another optical member, may be used. According to the E-type polarizer 125, an amount of light which is transmitted at an azimuth parallel to the transmission axis t azimuth is smaller than an amount of light which is transmitted at an azimuth parallel to the absorption axis a azimuth. Accordingly, in order to uniform an intensity of light transmitted at each azimuth and provide more excellent bright state at a wide azimuth and viewing angle, it is preferable that the viewing angle control film 140 has a function of outputting part of incident light from the azimuth parallel to the y axis azimuth into the azimuth parallel to the x axis azimuth as shown in FIG. 1. That is, it is preferable that the viewing angle control film 140 has a function of outputting part of light which has entered the viewing angle control film 140 from an azimuth parallel to the absorption axis a azimuth of the E-type polarizer 125 to an azimuth parallel to the transmission axis t azimuth.

The present technology is mentioned below in more detail with reference to Embodiments, but the present technology is not limited to these Embodiments.

Embodiment 1

A liquid crystal cell was prepared by separating polarizers and retardation films arranged on both sides (observation surface side and the back surface side) of a liquid crystal display panel in a commercially available liquid crystal display device in normally black VA mode (product of Sharp Corp., trade name: LC20AX-5). Then, a triacetyl cellulose film (product of FUJIFILM Corp., trade name: TD-80U) was used as a base film, and thereon, an aqueous solution of lyotropic liquid crystal containing 16.7% by weight of a dichroic pigment on the solid content basis (product of Optiva, Inc., trade name: LC polarizer) was applied on the base film to have a thickness of 4 µm with a wire bar. Then, the coated liquid was dried at 40° C. to provide an E-type polarizer. Thus-prepared E-type polarizer was arranged on the back surface side of the liquid crystal cell in such a way that the base film surface was not on the liquid crystal cell side (the coated surface is on the side of the liquid crystal cell). An O-type polarizer (product of Nitto Denko Corp., trade name: SEG1224DU) was arranged on the observation surface side of the liquid crystal cell in such a way that the absorption axis azimuth in the plane of the O-type polarizer was perpendicular to the absorption axis azimuth in the plane of the E-type polarizer. A negative C plate was arranged between the liquid crystal cell and the back surface side-polarizer.

The function of this negative C plate was to cancel a retardation of liquid crystals in the liquid crystal cell, the retardation being generated at an oblique viewing angle (in an oblique direction). In the VA mode liquid crystal display device, the negative C plate whose retardation has been optimally determined can cancel the retardation at all azimuths. In the present Embodiment, a norbornene transparent film (product of JSR Corp., trade name: ARTON (registered trademark)) was sequentially biaxially stretched. As a result, a negative C plate satisfying $(nx-nz) \times d = 260$ nm was obtained and used. Further, silica fine particles are dispersed and mixed with a UV curable resin, and the mixture was cured and adjusted to have a haze of 65%. Thus-obtained diffusion sheet (viewing angle control element) was arranged on the observation surface side of the O-type polarizer.

According to the present Embodiment, a refractive index and a retardation were measured with a PEN spectral ellipsometer (trade name: M-220, product of JASCO Corp.). Retardations in the normal direction of the retardation film, in a direction tilted by 40° from the normal direction, and in a direction tilted by −40° from the normal direction were measured. Then, based on these retardations, a value of $(nx-nz) \times d$ was calculated from curve fitting (curve approximation) of a common refractive-index ellipse formula. The tilt azimuth is an azimuth perpendicular to an in-plane phase delay axis.

Thus-obtained liquid crystal display panel was lighted with a diffusion backlight system (hereinafter, also referred to as "standard backlight"). This standard backlight was prepared by removing a prism sheet and a luminance-enhancing film (reflective polarization film) from a diffusion backlight system included in a commercially available normally black VA mode liquid crystal display device for TV (product of Sharp Corp., trade name: LC20AX-5). Thus, a liquid crystal display device in Embodiment 1 was prepared.

According to the O-type polarizer which was used in the present Embodiment, $Ka \times d$, $Kt \times d$, and $Kz \times d$ were 385 nm, 5 nm, and 5 nm, respectively. According to the E-type polarizer prepared in the present Embodiment, $Ka \times d$, $Kt \times d$, and $Kz \times d$ were 195 nm, 25 nm, and 190 nm, respectively. The $Ka \times d$ and $Kt \times d$ were calculated back from transmittances measured by a common method. The $Kz \times d$ was calculated back from a transmittance measured at an oblique viewing angle.

Embodiment 2

A liquid crystal display device in the present Embodiment has the same configuration as in Embodiment 1 except that the following viewing angle control element was used. A microlens array sheet (refer to Embodiment 1 in Japanese Kokai Publication No. Hei-05-249453) which includes convex lenses (material: UV-curable acrylic resin, a regular hexagonal bottom surface having a scattering intensity of 15°, and an arrangement pitch of the lenses: 64 µm) on one surface of a transparent base film (material: polyester, thickness: 188 µm), was arranged in such a way that: the surface where the convex lenses are formed is on the liquid crystal cell side and the other surface is on the observation surface side; and that a diffusion major axis azimuth of the sheet is parallel to a transmission axis azimuth in the plane of the O-type polarizer (an absorption axis azimuth in the plane of the E-type polarizer).

Embodiment 3

A liquid crystal display device in the present Embodiment has the same configuration as in Embodiment 2, except that as the viewing angle control element, a light diffraction film (product of Sumitomo Chemical Co., Ltd., trade name: LUMISTY, product number: MFX-1515) was arranged in such a way that an azimuth where opaque state is observed is parallel to a transmission axis azimuth in the plane of the O-type polarizer (an absorption axis azimuth in the plane of the E-type polarizer).

Embodiment 4

A liquid crystal display device in the present Embodiment has the same configuration as in Embodiment 1, except that a prism sheet (product of Sumitomo 3M, trade name: brightness enhancement film BEF III) was arranged between the standard backlight and the liquid crystal display panel in such a way that diffusion light outputted into an azimuth parallel to an absorption axis azimuth in the plane of the E-type polarizer is condensed.

Comparative Embodiment 1

According to a liquid crystal display device in the present Comparative Embodiment, an O-type polarizer (product of Nitto Denko Corp., trade name: SEG1224DU) was arranged on both sides of a liquid crystal cell in such a way that an absorption axis azimuth of the O-type polarizer on the back surface side is perpendicular to an absorption axis azimuth of the O-type polarizer on the observation surface side. Further, a biaxial retardation film is arranged between the liquid crystal cell and the O-type polarizer on the back surface side in order to widen the viewing angle under dark state. This biaxial retardation film is optimally designed in such a way that light leakage at an azimuth of 45° and a viewing angle of 40° is the minimum. A norbornene transparent film (product of JSR Corp., trade name: ARTON) is sequentially biaxially stretched. As a result, a biaxial retardation film satisfying (nx−ny)×d=60 nm, (nx−nz)×d=260 nm was prepared. Thus-obtained liquid crystal display panel was lighted with the standard backlight. As a result, a liquid crystal display device in Comparative Embodiment 1 was prepared.

In the present Comparative Embodiment, a refractive index and a retardation were measured with a PEM spectral ellipsometer (trade name: M-220, product of JASCO Corp.). Retardations in the normal direction of the retardation film, in a direction tilted by 40° from the normal direction, and in a direction tilted by 140° from the normal direction were measured. Then, based on these retardations, a value of (nx−nz)×d was calculated from curve fitting (curve approximation) of a common refractive-index ellipse formula. The tilt azimuth is an azimuth perpendicular to the in-plane phase delay axis.

Comparative Embodiment 2

A liquid crystal display device in the present Comparative Embodiment has the same configuration as in Embodiment 1, except that no diffusion sheet (viewing angle control element) was arranged.

"Evaluation"

Figure 2:
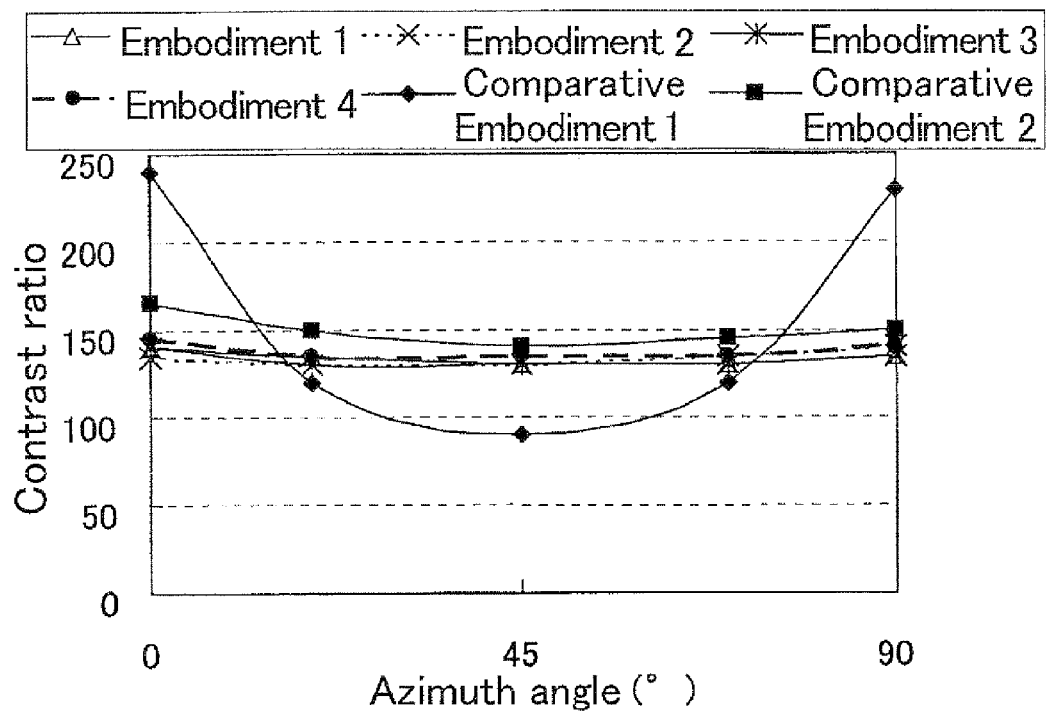
FIG. 2 is a graph showing viewing angle characteristics of a contrast ratio in the liquid crystal display devices in accordance with Embodiments 1 to 4 and Comparative Embodiments 1 and 2.
Figure 3:
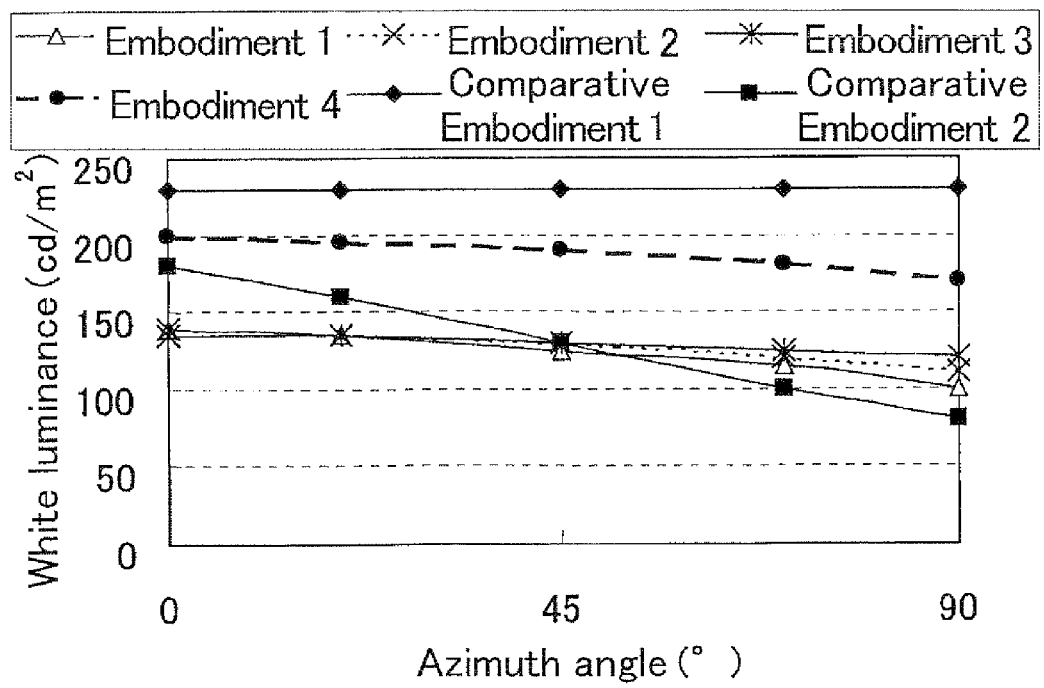
FIG. 3 is a graph showing viewing angle characteristics of a white luminance in the liquid crystal display devices in accordance with Embodiments 1 to 4 and Comparative Embodiments 1 and 2.
Figure 4A:
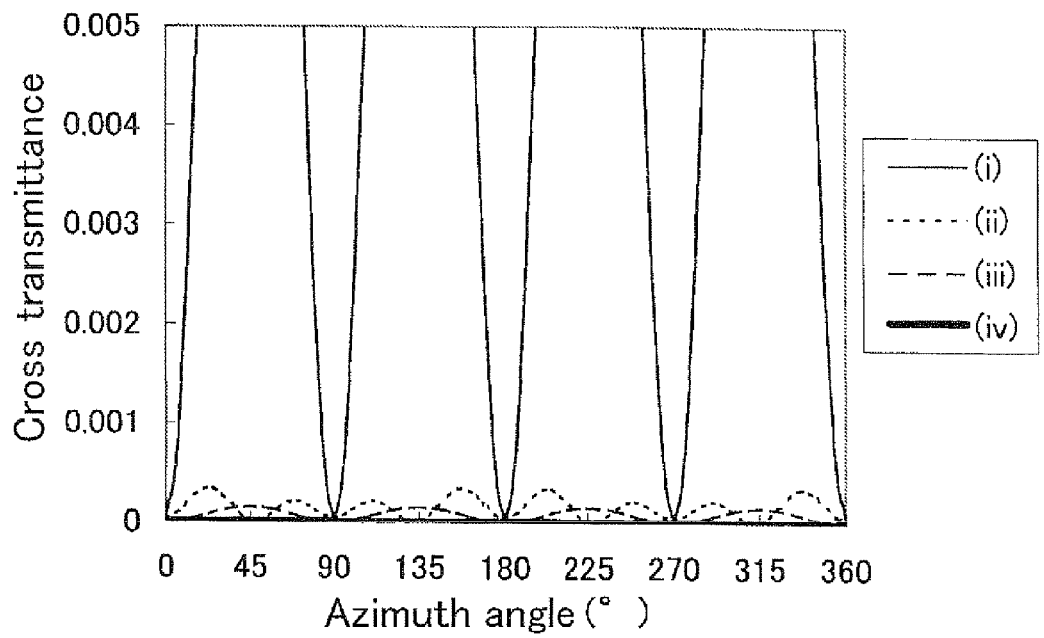
FIG. 4A is a graph showing azimuth angle dependency of a cross transmittance at a polar angle of 60° in four polarization control systems (i) to (iv).
Figure 4B:
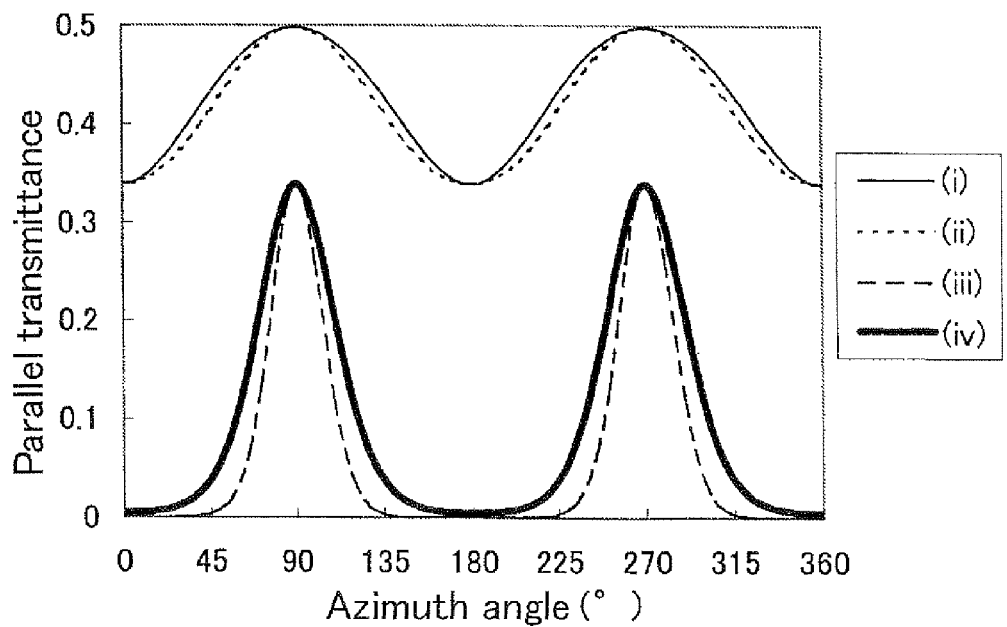
FIG. 4B is a graph showing azimuth angle dependency of a parallel transmittance at a polar angle of 60° in the four polarization control systems (i) to (iv).
Figure 5A:
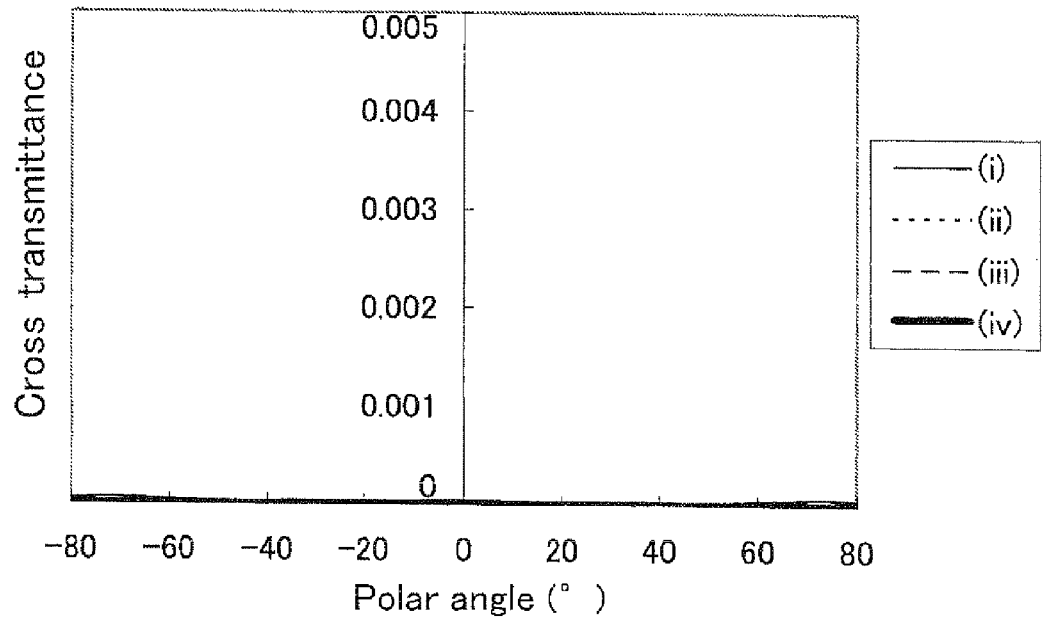
FIG. 5A is a graph showing polar angle dependency of a cross transmittance at an azimuth angle of 0° in the four different polarization control systems (i) to (iv).
Figure 5B:
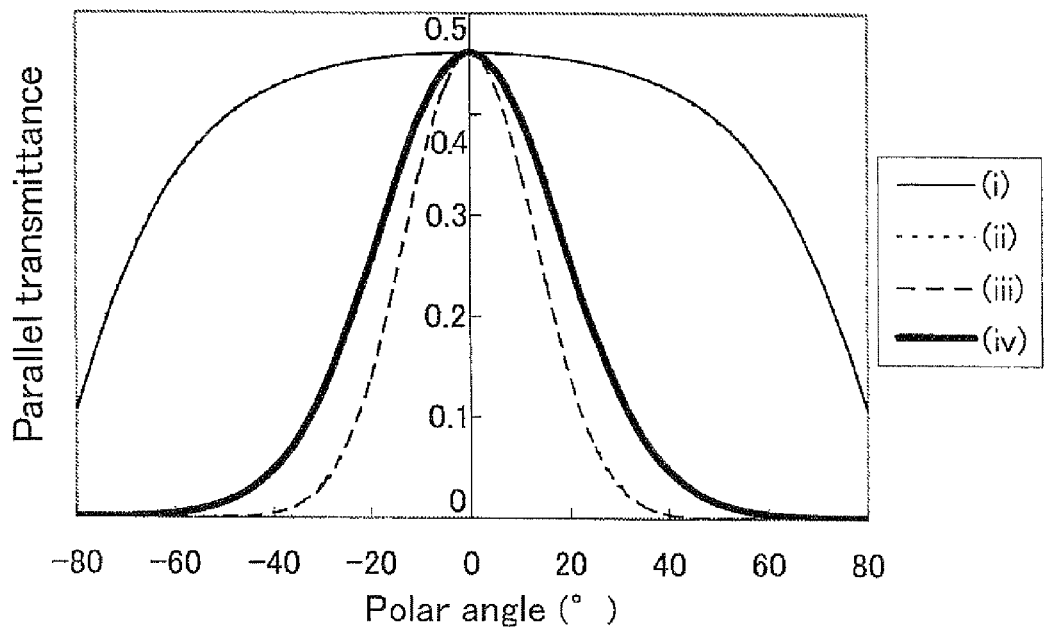
FIG. 5B is a graph showing polar angle dependency of a parallel transmittance at an azimuth angle of 0° in the four polarization control systems (i) to (iv).
Figure 6A:
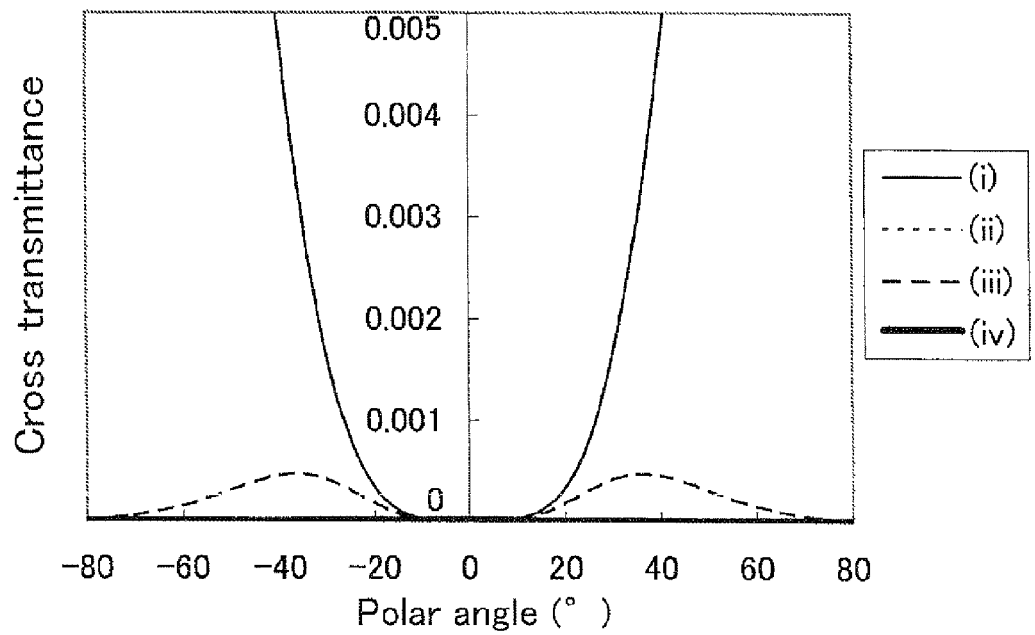
FIG. 6A is a graph showing polar angle dependency of a cross transmittance at an azimuth of 45° in the four polarization control systems (i) to (iv).
Figure 6B:
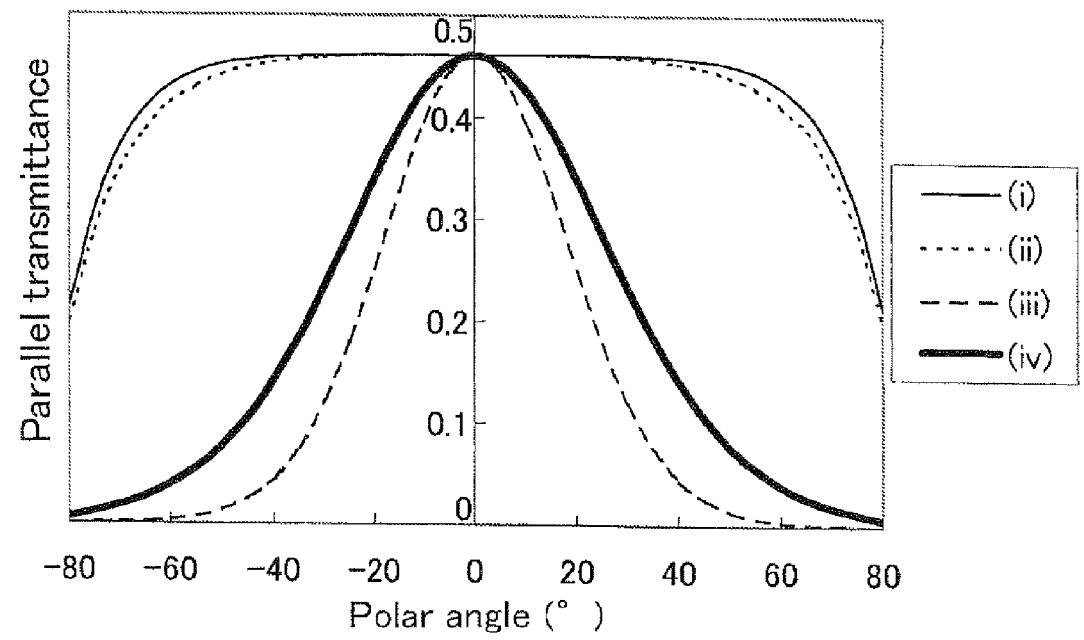
FIG. 6B is a graph showing polar angle dependency of a parallel transmittance at an azimuth of 45° in the four polarization control systems (i) to (iv).
Figure 7A:
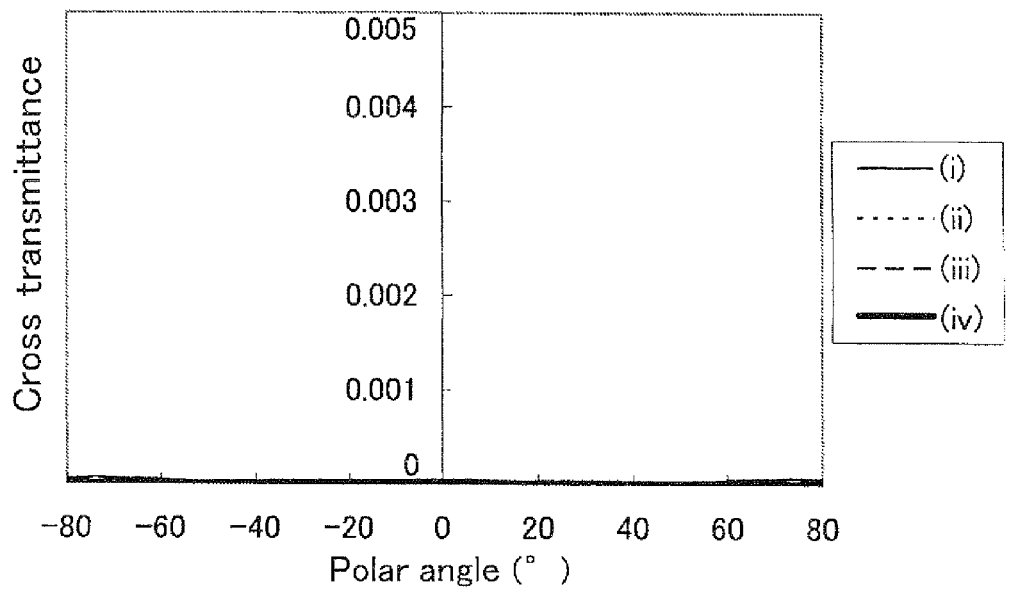
FIG. 7A is a graph showing polar angle dependency of a cross transmittance at an azimuth angle of 90° in the four polarization control systems (i) to (iv).
Figure 7B:
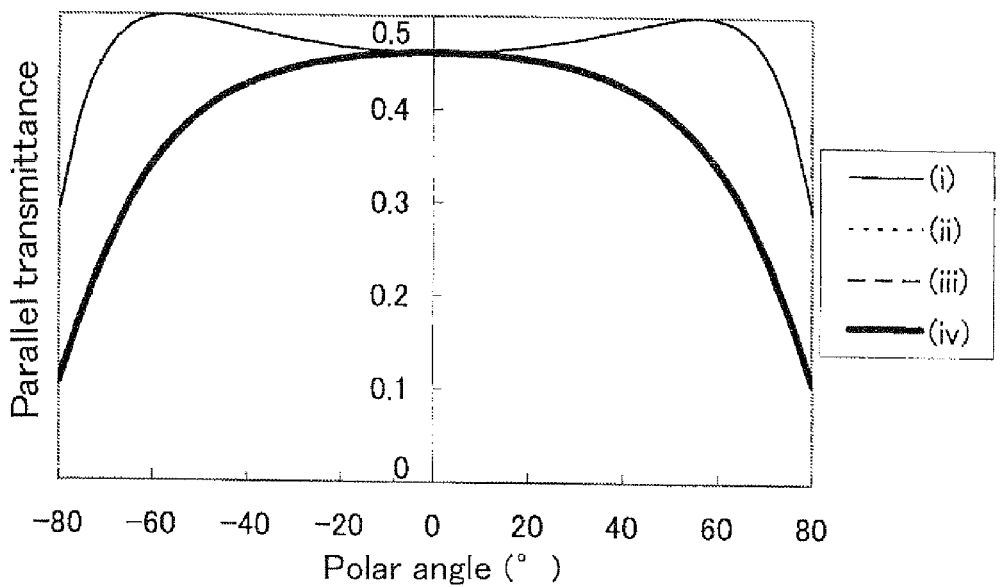
FIG. 7B is a graph showing polar angle dependency of a parallel transmittance at an azimuth angle of 90° in the four polarization control systems (i) to (iv).
Figure 8A:
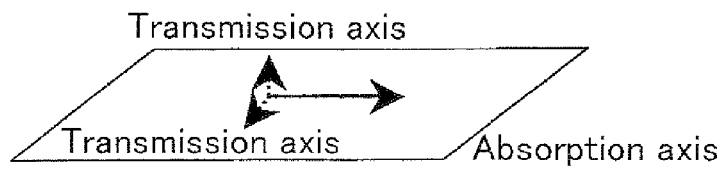
FIG. 8A is a perspective view schematically showing polarization characteristics of an O-type polarizer. The length of the arrow varies with the magnitude of an extinction coefficient.
Figure 8B:
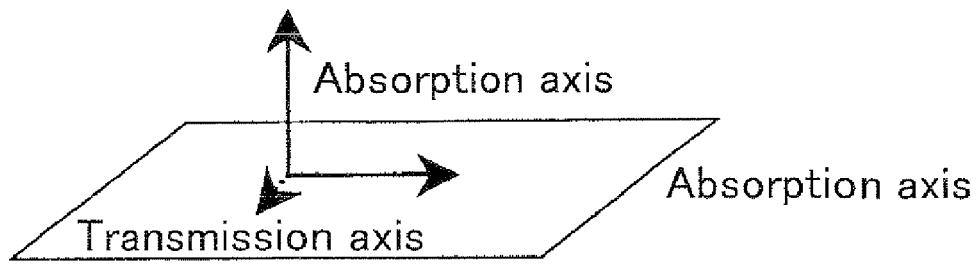
FIG. 8B is a perspective view schematically showing polarization characteristics of an E-type polarizer. The length of the arrow varies with the magnitude of an extinction coefficient.
Figure 9A:
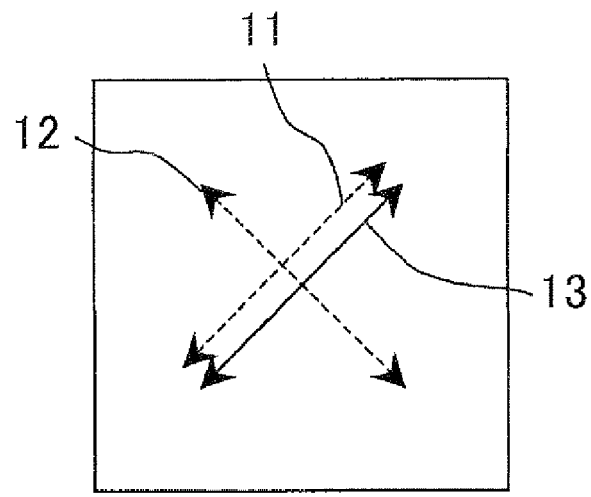
FIG. 9A is a planar view schematically showing an arrangement relationship among the respective polarization axes when the polarizers are viewed in the normal direction in the case where, as the polarizers, the same types of a polarizer and an analyzer are disposed in Cross-Nicol arrangement.
Figure 9B:
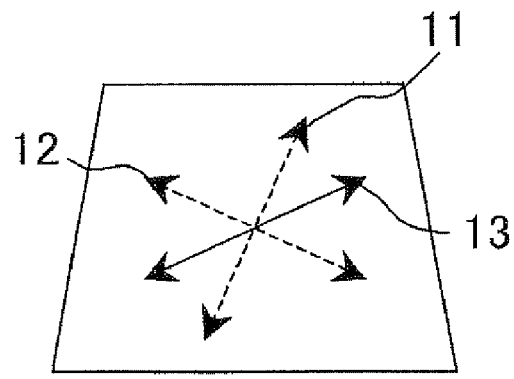
FIG. 9B is a planar view schematically showing an arrangement relationship among the respective polarization axes when the polarizers are viewed at a viewing angle tilted at an azimuth of 45°.
Figure 10A:
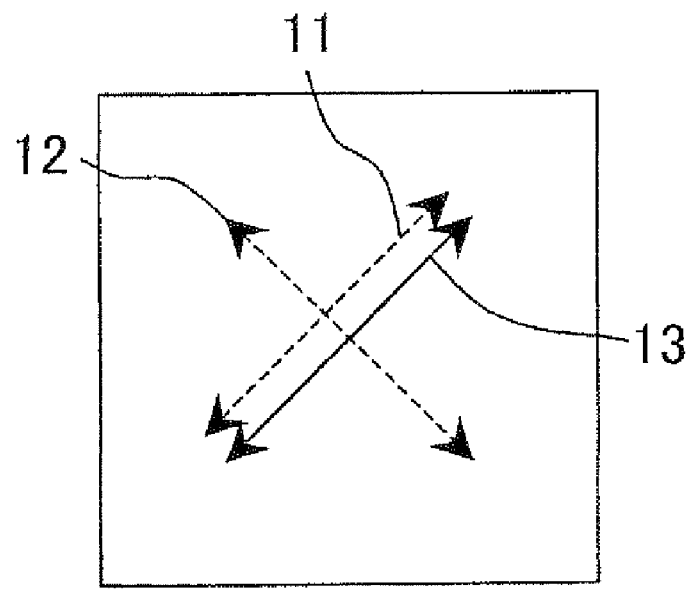
FIG. 10A is a planar view schematically showing an arrangement relationship among the respective polarization axes when the polarizers are viewed in the normal direction in the case where an E-type polarizer is used as the polarizer and an O-type polarizer is used as the analyzer.
Figure 10B:
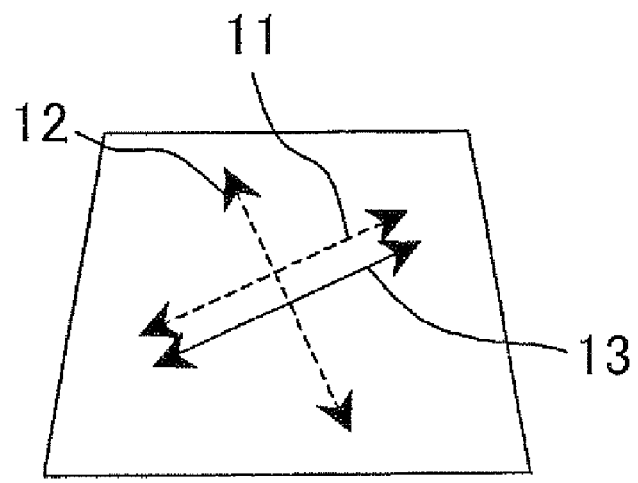
FIG. 10B is a planar view schematically showing an arrangement relationship among the respective polarization axes when the polarizers are viewed at a viewing angle tilted at an azimuth of 45°.

The liquid crystal display devices in the respective Embodiments were measured for white luminance and contrast ratio (white luminance/black luminance) with a viewing angle measurement device (product of ELDIM, trade name: Ez-Contrast 160). The measurement was performed in directions tilted by 40° from the normal direction of the polarizers, at azimuth angles of 0°, 20°, 45°, 70°, and 90° relative to the transmission axis azimuth (azimuth angle of)0° of the back surface side-polarizer. The following Table 1, FIGS. 2 and 3 show the measurement results dard backlight and the prism sheet were used in combination, thereby adjusting the diffusion illumination means in such a way that an amount of light outputted to the azimuth parallel to the absorption axis azimuth of the E-type polarizer is larger than an amount of light outputted to the azimuth parallel to the transmission axis azimuth of the E-type polarizer, and therefore, an absolute value of the white luminance was improved at a wider azimuth and viewing angle in comparison to that in Embodiment 1.

In the present description, the transmission axis of the polarizer means a transmission axis in the polarizer plane, and the absorption axis of the polarizer means an absorption axis in the polarizer plane, unless otherwise specified.

The terms "or more" and "or less" in the present description means that the value described (boundary value) is included.

EXPLANATION OF NUMERALS AND SYMBOLS a: Absorption axis
t: Transmission axis
11: Transmission axis of polarizer
12: Absorption axis of polarizer
13: Absorption axis of analyzer
100: Liquid crystal display device
110: Diffusion illumination means (light source device)
111: Light reflection sheet
112: Light source
113: Light diffuser
114: Directivity-controlling means
120: Liquid crystal cell
121: Back surface side-substrate
122: Liquid crystal layer
123: Observation surface side-substrate

| | Back surface side-polarizer | Observation surface side-polarizer | Viewing angle control film | Illumination | Contrast ratio | | | | | White luminance (cd/m$^2$) | | | | |
|---|---|---|---|---|---|---|---|---|---|---|---|---|---|---|
| | | | | | 0° | 20° | 45° | 70° | 90° | 0° | 20° | 45° | 70° | 90° |
| Embodiment1 | E type | O type | Diffusion sheet | Standard Backlight | 140 | 135 | 130 | 130 | 135 | 140 | 135 | 125 | 115 | 100 |
| Embodiment2 | E type | O type | Microlens array | Standard backlight | 135 | 130 | 130 | 135 | 140 | 140 | 135 | 130 | 120 | 110 |
| Embodiment3 | E type | O type | Light difraction | Standard backlight | 140 | 130 | 130 | 130 | 135 | 135 | 135 | 130 | 125 | 120 |
| Embodiment4 | E type | O type | Diffusion sheet | Standard backlight and prism sheet | 145 | 135 | 135 | 135 | 140 | 200 | 195 | 190 | 180 | 170 |
| Comparative Embodiment1 | O type | O type | None | Standard backlight | 240 | 120 | 90 | 120 | 230 | 230 | 230 | 230 | 230 | 230 |
| Comparative Embodiment2 | E type | O type | None | Standard backlight | 185 | 150 | 140 | 145 | 150 | 180 | 160 | 130 | 100 | 80 |

Table 1 and FIG. 2 show that in Embodiments 1 to 3 and Comparative Embodiment 2 where the O-type polarizer and the E-type polarizer were used in combination, the contrast ratios at a viewing angle of 40° and at azimuth angles of 20°, 45°, and 70° were higher than those in Comparative Embodiment 1 where two O-type polarizers were used. That is, it is shown that the viewing angle characteristics of the contrast ratio were improved. Table 1 and FIG. 3 show that according to Embodiments 1 to 3 where the viewing angle control film was used, the viewing angle characteristics of the white luminance were improved in comparison to Comparative Embodiment 2. Further, it is shown that in Embodiment 4, the stan- 130: Liquid crystal display panel
140: Viewing angle-controlling film (viewing angle control element)

The invention claimed is:
1. A polarization control system comprising a plurality of polarizer,
wherein the polarization control system includes an E-type polarizer and a viewing angle control element, and
the viewing angle control element controls a traveling direction of light which has passed through the E-type polarizer by switching part of the light which has entered the viewing angle control element, so that the intensity of the light transmitted at each azimuth is uniform, wherein the viewing angle control element outputs part of light which has entered the viewing angle control element from an azimuth parallel to an absorption axis azimuth in a plane of the E-type polarizer into an azimuth substantially parallel to a transmission axis azimuth in the plane of the E-type polarizer.

2. The polarization control system according to claim 1, wherein the viewing angle control element is at least one optical element selected from the group consisting of a lens film, a scattering film, a light diffraction film, and an anti-glare film.

3. The polarization control system according to claim 1, further comprising an O-type polarizer.

4. The polarization control system according to claim 3, wherein the E-type polarizer and the O-type polarizer are disposed in Cross-Nicol arrangement.

5. A display device comprising the polarization control system of claim 1.

6. The display device according to claim 5, comprising a liquid crystal display panel and a viewing angle control element on an observation surface side of the liquid crystal display panel, the liquid crystal display panel including a liquid crystal layer between a pair of polarizers, and at least one of the pair of polarizers being an E-type polarizer.

7. The display device according to claim 6, wherein one of the pair of polarizers is an E-type polarizer, and the other is an O-type polarizer.

8. The display device according to claim 7, wherein the E-type polarizer and the O-type polarizer are disposed in Cross-Nicol arrangement.

9. The display device according to claim 5, wherein the display device provides display using a light source device, an amount of light which is emitted by the light source device into an azimuth parallel to an absorption axis azimuth in a plane of the E-type polarizer is larger than an amount of light which is emitted by the light source device into an azimuth parallel to a transmission axis azimuth in a plane of the E-type polarizer.

10. A polarization control system comprising a plurality of polarizers, wherein the polarization control system includes an E-type polarizer and a viewing angle control element, and the viewing angle control element is arranged in such a way that an azimuth where opaque state is observed is parallel to an absorption axis azimuth in a plane of the E-type polarizer, wherein the viewing angle control element shows anisotropic transmission and diffusion properties, and
a diffusion major axis azimuth of the viewing angle control element is parallel to the absorption axis azimuth in the plane of the E-type polarizer.

11. The polarization control system according to claim 10, wherein the viewing angle control element includes optical element units for controlling an output direction of an incident light beam, the optical element units being arrayed in plane, and
an array direction of the optical element units is parallel or perpendicular to the absorption axis azimuth in the plane of the E-type polarizer.

12. The polarization control system according to claim 10, wherein the viewing angle control element is at least one optical element selected from the group consisting of a microlens array film, a lenticular lens film, and a light diffraction film.

13. The polarization control system according to claim 10, further comprising an O-type polarizer.

14. The polarization control system according to claim 13, wherein the E-type polarizer and the O-type polarizer are disposed in Cross Nicol arrangement.

15. A display device comprising the polarization control system of claim 10.

16. The display device according to claim 15, comprising a liquid crystal display panel and a viewing angle control element on an observation surface side of the liquid crystal display panel, the liquid crystal display panel including a liquid crystal layer between a pair of polarizers, and at least one of the pair of polarizers being an E-type polarizer.

17. The display device according to claim 16, wherein one of the pair of polarizers is an E-type polarizer, and the other is an O-type polarizer.

18. The display device according to claim 17, wherein the E-type polarizer and the O-type polarizer are disposed in Cross Nicol arrangement.

19. The display device according to claim 15, wherein the display device provides display using a light source device, an amount of light which is emitted by the light source device into an azimuth parallel to the absorption axis azimuth in the plane of the E-type polarizer is larger than an amount of light which is emitted by the light source device into an azimuth parallel to a transmission axis azimuth in the plane of the E-type polarizer.

* * * * *